United States Patent [19]

Weber

[11] 4,375,805
[45] Mar. 8, 1983

[54] SOLAR ROOF, EAVES AND GUTTER DEVICE

[76] Inventor: Richard D. Weber, 1516 Snelling Ave., North, St. Paul, Minn. 55108

[21] Appl. No.: 231,298

[22] Filed: Feb. 4, 1981

[51] Int. Cl.³ .................................................. F24J 3/02
[52] U.S. Cl. ......................................... 126/417; 52/11
[58] Field of Search ....................... 126/417; 52/11, 16

[56] References Cited

U.S. PATENT DOCUMENTS

| | | | |
|---|---|---|---|
| 824,570 | 6/1906 | Myser | 52/16 |
| 2,111,251 | 3/1938 | Spilsbury | 52/11 |
| 2,699,484 | 1/1955 | Michaels | 52/94 |
| 3,001,331 | 9/1961 | Brunton | 52/18 |
| 3,207,211 | 9/1965 | Winterfeldt | 126/417 |
| 3,366,168 | 1/1968 | Dale | 126/417 |
| 3,388,738 | 6/1968 | Dery | 52/11 |
| 3,915,418 | 10/1975 | D'Amato | 52/11 |
| 4,041,656 | 8/1977 | Anderson | 52/16 |
| 4,043,527 | 8/1977 | Franzmeier | 52/11 |
| 4,224,923 | 9/1980 | Wells | 126/417 |

Primary Examiner—Ronald C. Capossela
Attorney, Agent, or Firm—Anthony G. Eggink

[57] ABSTRACT

The solar roof, eaves and gutter device is for collecting solar radiation and heat loss from a heated structure below the roof, and to utilize the captured energy to melt ice and snow from the roof, eaves and gutter of a building structure to prevent damage to the lower roof areas of the building structure. The solar device includes a generally flat base strip of an energy absorbent material for securing the device to the lower roof areas of the structure and at least one adjustable solar collector tab for optimal orientation towards the sun to receive solar radiation and to transmit this energy to other portions of or connected to the device. The solar collector tabs being either a cut out from and congruous with the base strip or being a separate portion rotatably mounted to the base strip. The device is suitable for use on roofs either with or without a gutter. In the latter case, the device has means to secure it to the upper and outer portion of the gutter, thereby aiding the support of the gutter and aiding the melting of ice and snow therein and about. A simple method of manufacturing the device allows it to be an economical and easy to install solar roof accessory, which requires no maintenance and provides a valuable winter roof service.

10 Claims, 5 Drawing Figures

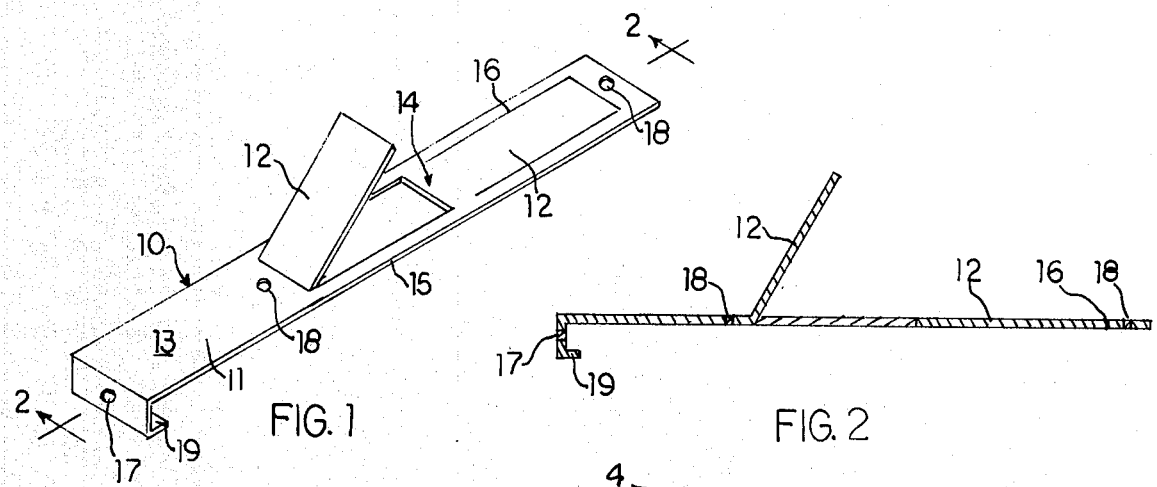
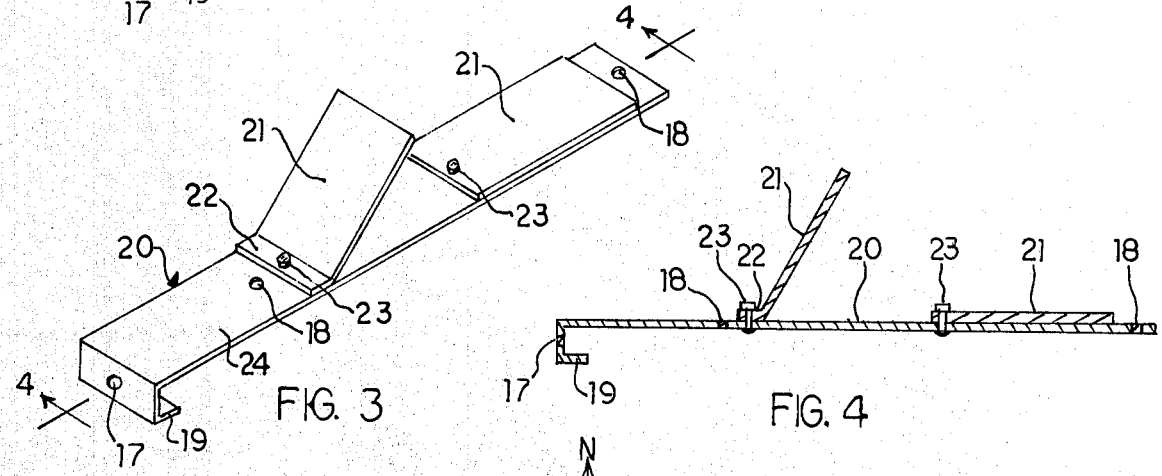
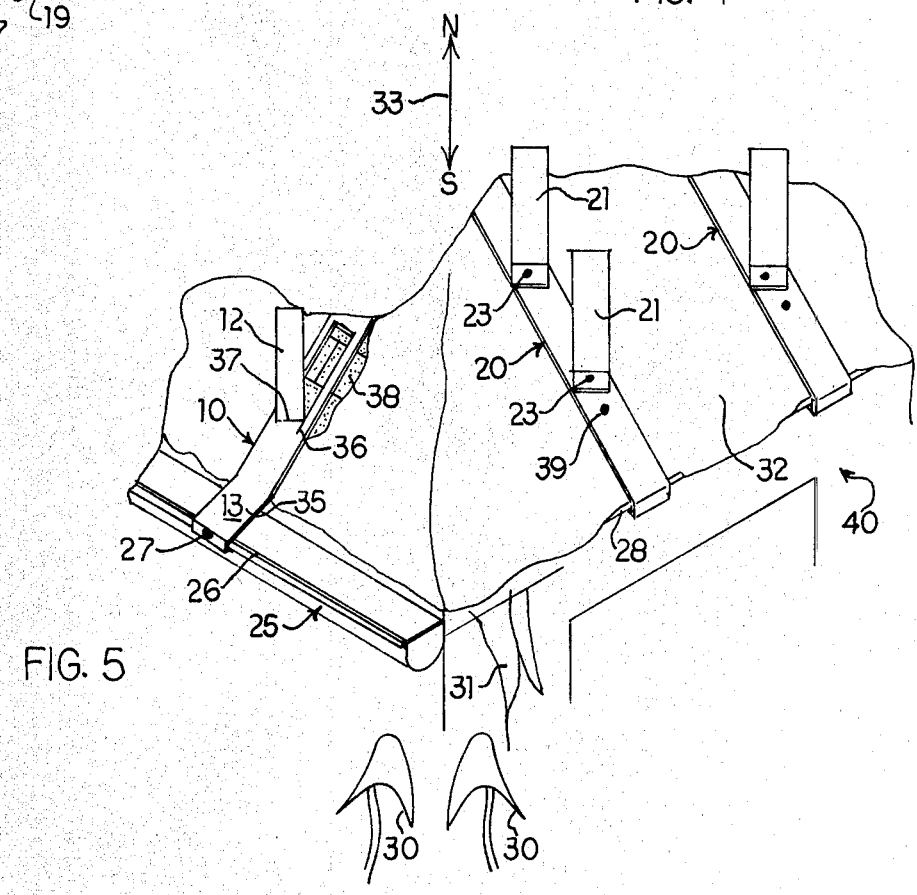

SOLAR ROOF, EAVES AND GUTTER DEVICE

This invention relates to a solar roof, eaves and gutter device for installation onto the lower roof areas of building structures to prevent roof damage by the accumulation of ice and snow. Particularly, this invention relates to a device which is economical to manufacture, easy to install, versatile in use, and which provides an adjustable solar collector mechanism to optimize the collecting of solar radiation.

In geographical areas where temperatures decline below the freezing point of water, snow and ice accumulation continually causes roof damage to building structures. Heat loss from the interior of the building through the roof, as well as outside temperature fluctuations about the freezing point of water, causes a layer of ice to form adjacent to the roof surface. The expansion of ice ultimately results in its upward motion which lifts the roofing materials, such as shingles, and which can result in the leakage of water into the interior of the building. This phenomenon causes much property damage annually.

Despite the longstanding need to remedy this annual nuisance in an economical, efficient and simple fashion, only complex, costly and ineffective solutions have been proposed. A practical, simple and effective solution to the aforementioned problem is provided by the teachings of this invention.

In summary, this invention provides a solar roof, eaves and gutter device for collecting solar radiation and conducted heat energy from a building structure, and releases this collected energy to melt ice and snow from lower roof areas of the structure and create ice expansion lines to reduce damage to the lower roof areas.

The device has a base strip portion of an energy absorbing and releasing material. The base strip being fastenable generally perpendicular to the edge of a roof and having at least one pivotly and rotatably adjustable solar collector tab connected thereto. The solar collector tab being constructed of a deformable, energy absorbing and releasing material congruous with the strip portion, or optionally, of a bendable, energy absorbing and releasing material rotatably mounted at its bottom portion to the base strip. The solar collector, thereby, being adjustable for optimal orientation towards the trajectory of the sun.

Further, the device is a generally flat, longitudinally extending strip having a top and bottom surface, opposing longitudinally extending side edges, and a top and bottom portion. The bottom portion of the device is formed generally downward in a C-shaped manner to engage the bottom edge of the roof or eaves.

Another embodiment of the device has its bottom portion formed to engage the laterally extending outside top edge of a gutter. In this embodiment the device functions as a gutter strap to aid in securing the gutter in place relative to the edge of the eaves of the roof and, thereby, ensure proper drainage through the gutter. This embodiment allows the bottom portion of the base strip to extend across the top of the gutter onto the lower portion of a roof and, thereby, providing means to melt ice and snow to the outside edge of the gutter.

Additionally provided by this invention are solar devices having additional special features and advantageous structures and functions, as well as a method for manufacturing a simple, economical and effective solar roof, eaves and gutter device.

These and other benefits of this invention will become clear from the following description by reference to the drawings, wherein:

FIG. 1 is a schematic perspective view of one embodiment of the solar roof, eaves and gutter device of this invention;

FIG. 2 is a schematic cross section taken on lines 2—2 of FIG. 1;

FIG. 3 is a schematic perspective view of another embodiment of the solar roof, eaves and gutter device of this invention;

FIG. 4 is a schematic cross section taken on lines 4—4 of FIG. 3; and,

FIG. 5 is a schematic perspective view of two embodiments of the solar device of this invention attached to and in use on a lower roof portion of a building structure.

Referring to FIG. 1, a solar roof, eaves and gutter device 10 is illustrated having a base strip 11, a lower or bottom portion 13, a side edge 15, a top surface 14, a cut line 16, and two bendable solar collector tabs 12. As shown, the solar collector tab 12 disposed towards the bottom portion of the device has been bent or deformed in an upward position relative to top surface 14, while the top solar collector tab 12 remains in the same plane as the base strip portion 11 and is defined only by cut line 16 which protrudes through base strip 11 from the top surface to the bottom surface of the device.

Further illustrated in FIG. 1 is a C-shaped end portion at the extreme bottom portion 13 of the device, an aperture 17 in the C-shaped end 19, and apertures 18 in base strip portion 11. The C-shaped end 19 is for attaching the device 10 about the lower edge of the roof eaves, or about the outside, upper edge of a gutter. In the latter case, a nail or similar fastening means is placed through aperture 17 to secure the bottom portion of device 10 to the outside and upper edge of the gutter. Apertures 18 shown in base strip 11 allow device 10 to be secured to the lower roof portion of a dwelling. Although a typical roofing nail can be utilized to accomplish this function, it should be noted that device 10 can also be fastened to a roof by means of adhesive placed between the bottom surface of device 10 and the upper surface of the roofing materials, such as the shingles. The latter fastening means would obviously reduce the possibility of roof leakage potentially caused by the nails or other protruding mechanisms through the apertures.

FIG. 2 which shows a schematic cross section taken on lines 2—2 of the device in FIG. 1, the apertures 17 and 18, C-shaped end 19, upward bent bottom collector tab 12, and top collector tab 12 defined by cut 16 are clearly illustrated.

As illustrated in these Figures, device 10 is generally a flat, longitudinally extending strip. The strip is comprised of an energy absorbing and releasing material which collects solar radiation and conducted heat energy, and which releases the collected energy to melt ice and snow from the area proximate to which it is mounted. Devices 10 made of aluminum or aluminous sheet material have been found to be well suited for this purpose. These sheet materials are lightweight, abundant in supply, corrosion resistant, and easily cut and machined. For purposes of maximizing the collection of solar radiation a black coated surface is preferred, however devices colored to match the color of the roof can also be utilized for aesthetic purposes, since some of the collected energy is the result of conducted heat loss from the building structure below the roof.

Another embodiment of the solar device of this invention is illustrated in FIGS. 3 and 4. Unlike the above described embodiment where the solar collector tabs 12 are congruous with the base strip, this embodiment shows a device 20 having collector tabs 21 rotatably mounted by means 23 to its base strip portion 24. This embodiment has similar apertures 17 and 18 for fastening purposes, a C-shaped bottom end, and similar dimensions, but its base strip 24 does not have cut lines 16 defining its solar tabs. Rather, it has seperately defined solar collector tabs 21 fastened to the base strip 24 of the device. The rotatable fastening means 23, such as rivets, allows the bendable energy collecting and releasing material of the tabs to be greater in width relative to base strip 24, and generally more easily rotated sothat its adjustability is more easily effected by the installer of the device. Additionally, this embodiment provides greater structural strength, and provides an increased amount of energy absorbing and releasing material. However, this embodiment does not lend itself to the economical and simple method of manufacture as does the former embodiment as will be described later.

A lower roof portion of building structure equiped with the solar roof, eaves and gutter device of this invention is illustrated in FIG. 5. A building structure 40 having a snow covered lower roof portion 32 and a gutter or eaves trough 25 is shown having a solar device 10 and a pair of solar devices 20 placed with their respective base strip portions 11 and 24 longitudinally upward with the slope of the roof. A North-South directional indicator 33 is shown along with solar radiation rays 30 to illustrate the function and versatility of the device of this invention.

Solar device 10 is mounted to the lower portion of the roof and has its bottom portion 13 extending over the open top portion of gutter 25. The lower C-shaped end of the device is connected to the top outside edge 26 of the gutter by fastener 27, a galvanized nail or sheet metal screw, for example. The device, thereby, additionally functions as a gutter strap or brace to aid in hanging or supporting the gutter. Section 35 of the device extends the melting capacity of the device above and to the gutter sothat a clear passage for drainage is formed for the melted ice and snow to the gutter. Although the base strip of the device does not face South, the solar collector tab 12 is bent or deformed from the plane of the base strip sothat it does face South to maximize the absorbtion of solar radiation. This is accomplished by simply pulling the tab from the cut line and by leaving a portion 36 of the cut line in place, the deformable aluminimum thin gauge material is twisted and bent at line 37 to orient the tab for maximum solar absorption. Simultaneously, the proper angle of the plane of tab 12 is secured to likewise gain maximum absorption. During winter months, the optimum angle or tilt of the tab is generally the latitude of the location plus 15° from the horizontal.

Also shown in FIG. 5 are two solar devices 20 having their respective lower C-shaped end portions fitted over the lower edges 28 of the roof eaves. As illustrated, the solar collector tabs 21 are positioned facing the South. This is easily accomplished by rotating tab 21 about rivet 23 and then bending upward the tab at base 22 as shown in FIG. 4. Devices 20 are shown fastened to snow covered lower roof 32 having icicles 31. Fastener 39 can be a galvanized roofing nail empaled through aperture 18 of the device and into the roofing surface such as shingles 38. Alternatively, the head of nail or fastener 39 is covered with a tar or plastic material to ensure leak prevention, or the base strip of the solar device can be directly bonded by an adhesive to the top of the roof.

It has been found that devices of this invention having a length of approximately two and one half feet, a width of approximately two to three inches and having a pair of solar collector tabs approximately one half foot in length, function well when spaced apart at distances of approximately three feet on the lower portion of a roof as shown in FIG. 5. The precise spacing, number of tabs, dimensions of the base strip and dimensions of the solar tab depend, of course, on the embodiment of the device, the expected snow cover on the roof, slope of the roof and, particularly, the geographical location of the building structure to be equiped with the devices. For example, a six inch solar collector tab is generally adequate to protrude beyond the snow cover of the roof, and a three foot spacing between devices is generally adequate to ensure proper drainage channels sothat the potential for roof damage due to ice buildup is minimized.

The spacing of the passive solar collector devices of this invention about the lower periphery of the roof can be accomplished economically and easily by the average homeowner. The embodiment shown in FIGS. 1 and 2 can likewise, be manufactured in an economical and novel method.

To manufacture these particular devices, a long strip or roll of a thin guage of aluminum or aliminous material is fed into the feeder portion of a stamping, cutting and trimming machine having a predetermined die. The devices are simply cut to length, stamped with the desired cut lines to define the solar collector tabs and apertures, and, subsequently trimmed and bent as desired. The cut lines 16, as shown in FIG. 1, can be totally within the body of base strip 11, or L-shaped. The latter configuration utilizing the side edges of the base strip to define one side edge of the solar collector tab. The tabs of this configuration also can be staggered to optimize solar radiation contact (i.e., using both opposing side edges of the base strip to alternately define opposing side edges of the solar tabs). The bottom portion 13 of the device can also be machined to suit particular needs, but the C-shaped ends 19 have been found to function well on roofs with or without gutters. A C-shaped bend of approximately three quarters of an inch downward from the plane of the base strip and one half inch back spacially parallel the base strip has been found optimal. In the manufacture of the die cut and stamped solar devices a three inch wide strip having approximately one and one fourth inch wide tabs have been found structurally optimum for the device shown in FIGS. 1 and 2.

Although relatively thin guage aluminum or aluminous materials have been found functional for the purposes of the devices, any deformable, energy absorbing and releasing material can be utilized.

As many changes are possible to the embodiments of this invention utilizing the teachings of the invention, the descriptions above and the accompanying drawings should be interpreted in the illustrative sense and not in the limited sense.

That which is claimed is:

1. A solar radiation collecting and heat conducting device for placement onto the lower roof areas of a building, said device for aiding the prevention of damage to the lower roof areas due to snow and ice buildup thereon, said device comprising a base strip portion of a energy absorbant material, said base portion for securing said device to the lower roof areas, said base portion having at least one cut line therein, said cut line defining a solar tab collector for receiving solar radiation and energy transmission with said base portion, said solar tab being so oriented to allow its faces to be positioned in a different plane than the upper face of said base portion, whereby the placement of said base portion onto the lower roof allows the user to orient said solar tab to allow optimal collecting of oncoming sunlight.

2. A generally flat, longitudinally extending strip for collecting solar radiation and conducting heat energy on a snow and ice covered roof area of a building, said strip constructed of an energy absorbant material for transferring the captured energy to melt the snow and ice and thereby preventing damage to the roof area, said strip having a top and bottom surface, a top and bottom portion, and longitudinally extending opposite side edges, said strip comprising at least one generally continuous curvilinear cut line for forming a deformable tab area, said tab area having a base congruous with said strip, whereby after said bottom surface of said strip is secured to a roof area said tab area is deformed at said base to optimally orient one surface toward the incoming sunlight sothat the solar radiation striking said tab area conducts the captured heat energy to the remaining portions of said strip and thereby melt the ice and snow in proximity to said strip.

3. A method of producing a solar radiation collecting and heat conducting device as described in claim 2 comprising:
   (a) providing a roll of an energy absorbing and releasing material,
   (b) providing a stamping and cutting machine having a die for defining the solar device of claim 2, said die having generally longitudinally extending and laterally extending cutting blades,
   (c) feeding said roll of material into said machine, whereby portions of said roll are cut to the length of the device of claim 2 and, whereby longitudinal and lateral cuts are produced to define the solar tabs of the device.

4. The solar device of claim 2 wherein said cut line defining said solar collector tab is located between the opposing side edges of said strip, and wherein said base of said tab area is disposed towards the bottom portion of the device.

5. The solar device of claim 2 wherein a portion of said generally continuous curvilinear cut line forming said deformable tab area is one of said opposing side edges of said strip.

6. The strip of claim 2 wherein the bottom portion thereof is designed to extend beyond the lower edge of a roof, said lower portion having means for securement to the outside portion of a gutter, whereby after attachment of said strip to the roof said strip aids in holding the gutter and forms an ice and snow melting device which extends above the gutter onto the lower portion of the roof.

7. A gutter hanger strap for securing the outside upper portion of a gutter to the top of the lower portion of a roof, said strap having an upper and lower end and an exposed face area, said strap consisting of an energy absorbant material, said strap comprising:
   (a) a gutter attachment means for securing said lower end of said strap to the upper outside portion of a gutter,
   (b) a base strip area extending from said lower end to said upper end of said hanger strap, said strip area for securing said hanger strap to the top of a lower portion of a roof, whereby the exposed face area of said strap absorbs the solar radiation and absorbs the heat loss from the building below the roof and thereby melts the snow and ice in its proximity to prevent damage to the roof from the snow and ice.

8. The gutter hanger strap of claim 7 wherein said base strip area has at least one tab cut out area having a base area congruous with said base strip, said tab cut out area for positioning in a generally upward direction whereby said tab cut out area can be oriented with its exposed face towards the sun and to thereby increase the energy absorbancy of said hanger strap.

9. The gutter hanger strap of claim 7 wherein said base strip area has at least one solar tab rotatably attached to and projecting generally upward from said exposed face area of said strap.

10. The gutter hanger strap of claim 9 wherein said solar tab is rotatably attached to said exposed face of said base strip area by means of a rivet.

* * * * *